(12) United States Patent
Sui et al.

(10) Patent No.: US 7,442,722 B2
(45) Date of Patent: Oct. 28, 2008

(54) FOAM CONTROL IN AQUEOUS MEDIA

(75) Inventors: Chihyu Sui, Newtown, PA (US); Gerald C. Walterick, Jr., Levittown, PA (US)

(73) Assignee: GE Betz, Inc., Trevose, PA (US)

( * ) Notice: Subject to any disclaimer, the term of this patent is extended or adjusted under 35 U.S.C. 154(b) by 332 days.

(21) Appl. No.: 11/099,358

(22) Filed: Apr. 4, 2005

(65) Prior Publication Data

US 2006/0223926 A1   Oct. 5, 2006

(51) Int. Cl.
*B01D 19/04* (2006.01)
(52) U.S. Cl. .................. 516/133; 516/134; 524/296; 524/297
(58) Field of Classification Search ............... 524/296, 524/297; 516/133, 134; 162/164.7, 168.1, 162/169
See application file for complete search history.

(56) References Cited

U.S. PATENT DOCUMENTS

| 4,836,951 | A | 6/1989 | Totten et al. |
|---|---|---|---|
| 5,275,628 | A | 1/1994 | Dimas et al. |
| 5,320,777 | A | 6/1994 | Nguyen et al. |
| 5,425,899 | A | 6/1995 | Nguyen et al. |
| 5,538,668 | A | 7/1996 | Hendriks |
| 5,562,862 | A | 10/1996 | Berzansky, Jr. et al. |
| 5,725,815 | A | 3/1998 | Wollenweber et al. |
| 5,858,279 | A | 1/1999 | Lunski et al. |
| 6,534,550 | B1 | 3/2003 | Walterick, Jr. |
| 6,605,183 | B1 | 8/2003 | Rautschek et al. |

FOREIGN PATENT DOCUMENTS

| EP | 1 076 073 A | 2/2001 |
|---|---|---|
| WO | WO 97/35067 A | 9/1997 |

*Primary Examiner*—Peter D Mulcahy
(74) *Attorney, Agent, or Firm*—Duane Morris LLP

(57) ABSTRACT

The present invention relates to foam control compositions and methods for controlling foam in aqueous media by adding to the system an effective amount of the foam control agent of the present invention. The antifoam/defoam compositions of the present invention include a concentration of active ingredients such as a polyalkylene glycol, a fatty alcohol alkoxylate, and an ethylene oxide-propylene oxide block copolymer, the compositions carried in polybutene and surfactants selected from polyethylene glycol esters, sorbitan esters, polyoxyethylene/polyoxypropylene fatty acid esters, and dialkyl phthalate. These compositions have been found to be superior in controlling foam versus conventional defoamers. The benefits of the foaming control effect are more evident at moderate to high temperatures and high caustic aqueous media such as Bayer process liquors.

20 Claims, 2 Drawing Sheets

FOAM CONTROL IN AQUEOUS MEDIA

FIELD OF THE INVENTION

The present invention relates to foam control compositions and methods for controlling foam in aqueous media. Specifically, the invention relates to an antifoam/defoam composition particularly useful in controlling foam problems encountered in moderate to high temperature processes such as Bayer process, pulp and paper mill process and effluent water streams.

BACKGROUND OF THE INVENTION

Many waste treatment systems and industrial processes have problems caused by foam that forms as the wastewater or process water flows through the system or process. Foam can occur in any aqueous stream that contains contaminants or additives that lower the surface tension of the stream. These materials are typically organic chemicals. They may be derived from natural chemicals (e.g., lignin, humic acid, tannin), waste chemicals, water treatment chemicals, process treatment chemicals, detergents, cleaners, products or byproducts of industrial processes, microbiological byproducts, etc. The system may also contain other materials that stabilize the foam after it has formed. Such materials include polymers, surfactants, suspended organic and inorganic solids, colloidal material, proteins, and microbiological organisms.

Foam problems frequently occur when a wastewater or process water stream is subjected to a unit operation that increases the total area of the system's gas/liquid interfaces. Such an increase occurs whenever a liquid is broken up into droplets or a gas is introduced into a liquid. Processes causing these effects include: mechanical processes (e.g., agitation, mixing, turbulent flow, pumping, aeration, gasification, reduction in pressure, increase in temperature), biological processes (e.g., fermentation, anaerobic digestion), and chemical processes (e.g., oxidation, recarbonation, gasification, distillation, solvent stripping, and reactions generating gas).

Foam in wastewater or process water is a problem for several reasons and can be detrimental to system processes (e.g., pumping, mixing, distillation, chemical reaction, heat transfer, evaporation, sedimentation, etc.). Foam can interfere with system sensors and controllers (e.g., level controllers, pH sensors, temperature sensors) and can adversely affect the quality and throughput of a product (e.g., crystal size and strength, holes in paper, and poor adhesion of coatings). Foam can also be a safety or health hazard (e.g., airborne bacteria and tank overflows), especially when aqueous media are highly acidic or caustic. It can also be an aesthetic problem (e.g., foamy discharge to receiving streams).

The Bayer process, a universally used process for producing alumina from bauxite (aluminum-containing) ores, experiences some of the most troublesome foam problems because of the inherent characteristics of bauxite (aluminum-containing) ore and the Bayer process. In the Bayer process, a finely ground bauxite ore slurry is digested in autoclaves at about 145-250° C. and 100-2000 p.s.i. in about 3-7 moles of sodium hydroxide solution to dissolve $Al_2O_3 \cdot xH_2O$ (x=1 or 3) as $NaAlO_2$, for up to 2 hours. The digested slurry is discharged from the digesters, then cooled down to about 100° C. and brought to atmospheric pressure via a series of flash tanks. The solution is separated from solids by countercurrent washing with the aid of flocculants, and then by filtration processes to obtain solid-free solution, called the "pregnant liquor." The pregnant liquor is supersaturated with $NaAlO_2$, and is further cooled to about 70-80° C. and fed to precipitation vessels to precipitate $NaAlO_2$ to $Al_2O_3 \cdot 3H_2O$ (alumina trihydrate crystals). The precipitation process is extremely slow, and may take up to 24-50 hours. The alumina trihydrate crystals are then calcined to remove binding water in the crystals to produce a final product, alumina ($Al_2O_3$).

During digestion in autoclaves, organic matter, in the form of complex cellulose and lignin substances associated with the bauxite ore are also extracted from the ore, and undergo oxidative attack in the caustic solution to form "humates" and the sodium salts of a variety of lower molecular weight organic acids. Since the Bayer process is a closed loop process, the solution in the system is continuously recycled to digestion where additional organic extraction from the bauxite occurs, with the organic impurity level building up in the solution stream and becoming quite significant, for example, up to 30 g/L of total organic carbon.

The organics in the solution stream cause significant foaming problems. Foaming usually occurs at any point after the digestion step where the pressure of the digested slurry is reduced to one atmosphere. The foaming of the solution is further aggravated by mechanical agitation and transfer of the solution from one vessel to the next. Foaming is especially a problem after separation of red mud, before and during the precipitation of alumina trihydrate. The foam poses a safety hazard due to its extremely caustic nature. Foam also complicates the heat control of the process, retarding heat loss, affecting crystal growth and quality, and reducing product yield and process efficiency. In light of the above safety, engineering and economic problems caused by Bayer process foam, improvements related to the control of foaming is a prime concern.

In the Bayer process, crystallization and precipitation of alumina prihydrates from sodium aluminate liquors is an important step toward the economic recovery of aluminum values. Bayer process operators optimize their precipitation methods so as to produce the greatest possible yield from the Bayer process liquors, while trying to achieve a given crystal size or crystal size distribution. It is desirable, in most instances, to obtain relatively large crystal sizes, since this is beneficial in subsequent processing steps required to produce alumina, alumina products, and/or aluminum metals. Chemical additives, such as flocculants and foam control reagents, may pose adverse effects on crystal growth, crystal size distributions, crystal strength and product purity. Therefore, any chemical additives to the process have to be carefully evaluated to avoid the creation of any undesirable side effects in the system.

There are several varieties of commercially available foam control products available for various industries. For example, block copolymers have been used as foam control reagents in the pulp and paper industry, food industry and paint and lacquer industry (U.S. Pat. Nos. 5,725,815, 5,538,668 and 4,836,951). A block copolymer is an effective foam controlling reagent, but its high cost limits its use in large quantities. Fatty alcohols and combinations of primary and alkoxylate alcohols are disclosed in U.S. Pat. No. 6,534,550. Their efficacy is demonstrated in the aqueous system from a paper making system. It is well known that polypropylene glycols with molecular weights in excess of about 1,000 are good antifoams because of their limited water solubility. The use of a water soluble polypropylene glycol with an average molecular weight of 200-600 in the Bayer process is disclosed in U.S. Pat. No. 5,275,628. Combinations of fatty alcohol and block copolymers used in the pulp and paper industry are disclosed in U.S. Pat. No. 5,562,862.

It is quite common that foam control reagents succeed only for a short period of time, with the activity of such products diminishing with time, so that it is frequently necessary to apply doses sequentially or at several empirically determined intervals. It would be desirable for foam control agents to suppress or eliminate foam for prolong periods of time. In the Bayer process, for example, it would be desirable if foam control agents are added to the precipitation vessels only at the beginning of the batch process, so as to effectively control foam for at least of 24 hours, or alternatively desirable if the activity of foam control agents could be maintained when the foam control agents move through consecutive precipitation vessels. Foam control products used to attenuate foaming are often more effective in neutral or weakly alkaline or weakly acidic media than in high caustic aqueous media, such as Bayer process solutions.

Effective antifoams should be insoluble, yet dispersible, in the foaming medium, be capable of controlling foam over a prolonged period of time, and have no negative impact on the down stream process. The present invention was developed in order to prevent or control the above described foaming problems.

SUMMARY OF THE INVENTION

The present invention relates to foam control compositions in aqueous media, particularly in waste water systems and industrial process systems. Those systems may have moderate to high temperatures, as well as high alkalinity. The present invention also relates to methods for controlling foam in aqueous media, particularly in waste water systems and industrial process systems, by adding to the system an effective amount of specific foam control components.

The present invention is directed to a method of adding to an aqueous system an effective amount of a composition comprising a polyalkylene glycol, a fatty alcohol polyalkoxylate and ethyoxylate/propyoxylate block copolymer, polybutene, a surfactant, such as polyethylene glycol ester, and dialkyl phthalate. The foam control composition includes, on a weight basis: about 5% to about 40% by weight, more preferably about 10% to about 30% of polyalkylene glycol; about 20% to about 90%, by weight, more preferably about 40% to about 60% of fatty alcohol alkoxylate; about 1% to about 20%, by weight, more preferably about 2-10% of ethylene oxide-propylene oxide block copolymer; about 3% to about 25%, by weight, more preferably 3% to 15% of polybutene; about 3% to about 25%, by weight, more preferably about 5-15% of a surfactant selected from the group consisting of a polyethylene glycol ester, sorbitan ester and polyoxyethylene/polyoxypropylene ester; and about 3% to about 25%, by weight, more preferably about 5-15% of dialkyl phthalate.

The antifoam/defoam compositions of the present invention have been found to be superior in controlling foam versus conventional foam control reagents. The foam control reagents of the present invention provide immediate foam elimination if foam has accumulated in aqueous media. The present invention also prevents foam from forming if added before foam is generated. In the above mentioned cases, foam control can last for at least 24 hours. The benefits of the foaming control effect are more evident at moderate to high temperatures and high caustic aqueous media such as Bayer process liquors.

DETAILED DESCRIPTION OF THE INVENTION

Figure 1:
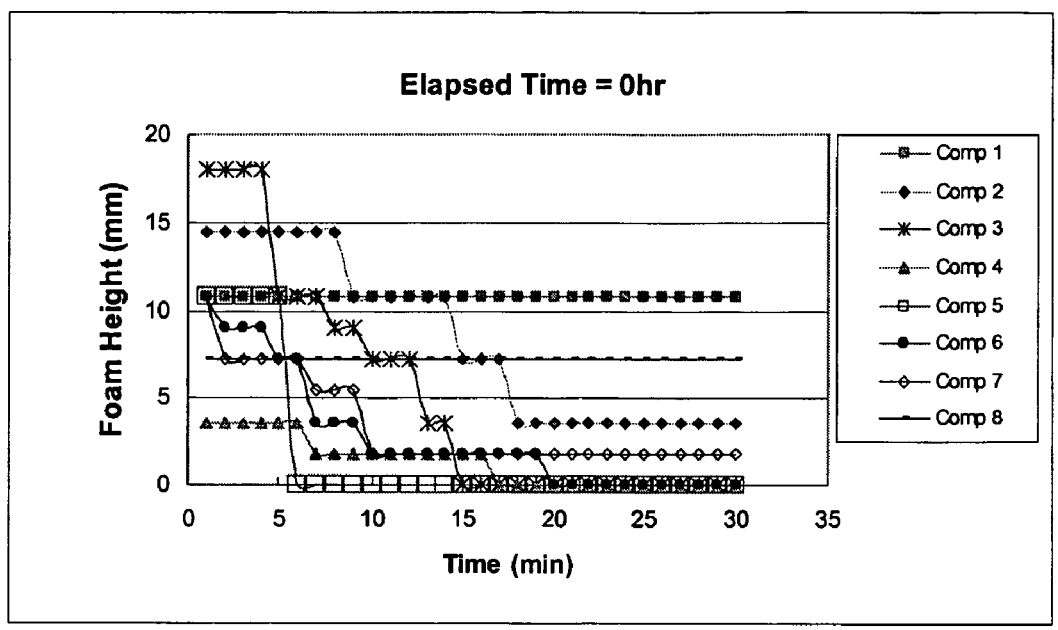
FIG. 1 is a graph illustrating the foam height as a function of time, elapsed time of 0 hours.

The present invention relates to an adduct of polyalkylene glycol, fatty alcohol alkoxylate, ethylene oxide-propylene oxide block copolymer, polybutene, dialkyl phthalate, and a surfactant selected from the group consisting of a polyethylene glycol ester, sorbitan ester and polyoxyethylene/polyoxypropylene ester for controlling foam in aqueous media, particularly in systems with moderate to high temperature and high alkalinity.

The polyalkylene glycol can be, e.g., a linear or branched polymer of ethylene and propylene oxide. The polyalkylene glycol can have molecular weight at least 1000, more preferably 2500-5000. The polyalkylene glycol has a cloud point of less than 60° C., preferably less than 50° C.

The alcohol polyalkoxylate component can comprise linear or branched C12 to C18 alcohol alkoxylates, preferably C12-C18 alcohol alkoxylates containing ethylene oxide groups and propylene groups. The number of ethoxylate units may be about 2-20; the number of propoxylate units may be about 0-15. The alcohol polyalkoxylate component can have a molecular weight of at least about 600, more preferably about 600 to 3000, and even more preferably about 1200 to 3000. The alcohol polyalkoxylate component can have a cloud point of at least 16° C.

The ethylene oxide-propylene oxide block copolymer can have a molecular weight of 1000-5000, preferably 3000-5000. The ethylene oxide-propylene oxide block copolymer can have a cloud point less than 40° C., more preferably less than 15° C. The ethylene oxide-propylene oxide block copolymer can have an HLB of 1-5, more preferably less than 2. The ethylene oxide-propylene oxide block copolymers to be used accordance with the present invention are liquid to highly viscous products. When highly viscous block copolymers are used, a liquid organic medium, such as alcohols, esters, methylene chloride, etc., may be used to disperse block copolymers, especially when hydrophobic polypropylene oxide components predominate in block copolymers.

The polybutene has some degree of foam control effect by itself; when combined with other foam control surfactants, its efficacy may be enhanced. The polybutene can have an average molecular weight of 300-3,000, more preferably from about 300-400.

The surfactants may include but are not limited to polyethylene glycol esters, sorbitan esters, polyoxyethylene/polyoxypropylene oleic acid and polyoxyethylene/polyoxypropylene dioleic acid. A preferred polyethylene glycol surfactant is a PEG 400 dioleate or PEG 600 dioleate. The polyoxyethylene/polyoxypropylene ester may be derived from polyoxyethylene/polyoxypropylene oleic acid or, alternatively, polyoxyethylene/polyoxypropylene dioleic acid.

The addition of an ester of 1,2-benzenedicarboxylic acid, especially 1,2-benzenedicarboxylic acid diisooctyl ester (diisooctyl phthalate) or 1,2-benzenedicarboxylic acid ditridecyl ester (ditridecyl phthalate) aids in rapidly carrying the surfactant to the air-liquid interface for defoaming action. The diisooctyl phthalate also serves as a co-solvent to stabilize and make the product translucent.

The relative amounts of the individual components of the present invention are given in Table 1 (values are in weight percent). The foam control agents of the present invention were tested in the solution from the Bayer process. The typical Bayer process liquors contain about 160-200 g/L of NaOH, 80-150 g/L Al$_2$O$_3$ and 6-25 g/L of total organic carbon. The agents were tested following the procedure described below.

A solution of 500 mL was charged to a 1 liter graduated cylinder. The temperature was maintained at 70° C. by placing the cylinder in a water bath. The foam was generated by placing an air sparger of a fritted glass disc into the bottom of the cylinder. Air was turned on at 1200 mL/min. when measurement was conducted. The antifoam/defoam agent was added by injecting with a syringe to the solution from the top of the cylinder at 30 µl/L, then air was turned on. The air circulated the solution in the cylinder and mixed the antifoam agent with the solution while generating foam. The foam height was observed and recorded every minute for 30 minutes. The measurement was conducted at 0 minutes, 4 hours and 24 hours to determine the efficacy and persistence of antifoam agents. The results were recorded as foam height versus time. The best performer would be one with less area under the curve, indicating the efficacy and persistence of the antifoam of the present invention after extended time periods (i.e., 4 and 24 hours).

Figure 2:
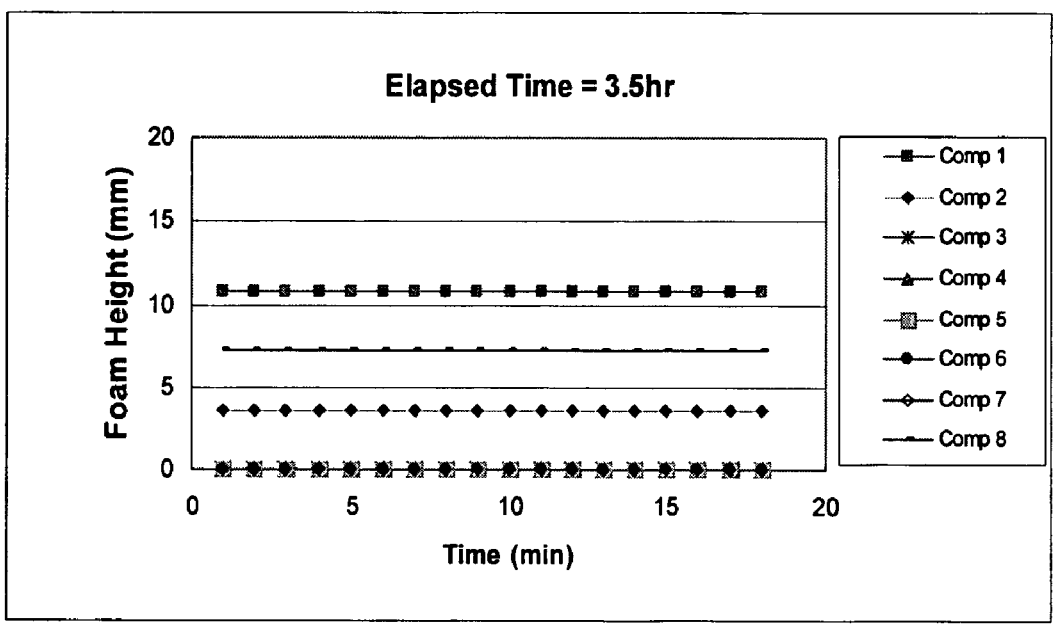
FIG. 2 is a graph illustrating the foam height as a function of time, elapsed time of 3.5 hours.
Figure 3:
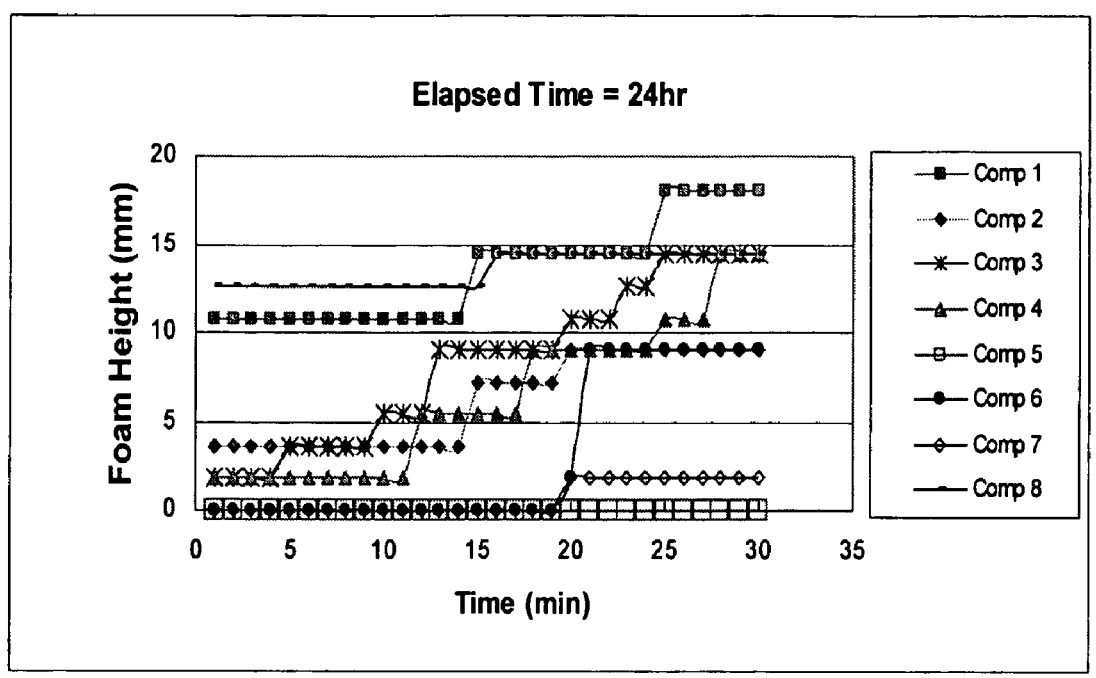
FIG. 3 is a graph illustrating the foam height as a function of time, elapsed time of 24 hours.

The test results are noted in Tables 2-4, and FIGS. 1-3. Without addition of the antifoam (baseline), the foam reached the top of the graduated cylinder of 1000 mL (used in the tests) within 3-5 minutes. The height of the foam for baseline tests was recorded as greater than 160 mm in Table 2-4. The baseline curves are not given in FIGS. 1-3.

EXAMPLES

Example 1

A polyalkylene glycol, a single component, was tested first. The immediate foam control action was observed, and the foam height was maintained at a relatively low level for more than 3.5 hours (FIGS. 1-2). However, polyalkoxylate glycol cannot completely prevent foam formation, and the foam height started increasing at 24 hours (Tables 2-4 and FIG. 3).

Example 2

A single component, fatty alcohol alkoxylate was tested. After air was turned on, the foam rose to 15 mm at the first 10 minutes, and then down to about 4 mm at about 18 minutes. At the end of testing (24 hours), foam height increased rapidly (Tables 2-4 and FIGS. 1-3).

Example 3

Composition 3 comprises fatty alcohol, polyalkylene glycol and block copolymer carried in polybutene. Similar to Composition 2, the foam rose up to 18 mm at the beginning of the test, gradually decreased to zero at 15 minutes, and rose again at the end of 24 hour testing. It was observed that there were some waxy like "particulates" floating on the surface of the solution in the cylinder when air was turned off (Tables 2-4 and FIGS. 1-3).

Example 4

Composition 4 has the same components as the Composition 3, but has a decreased ratio of fatty alcohol to polyalkylene glycol. Composition 4 provided improved foam control capability, but the waxy particulates were also observed (Tables 2-4 and FIGS. 1-3).

Example 5

Composition 5, a surfactant, for example, polyethylene glycol ester and a dialkyl phthalate, were added to Composition 4. Composition 5 provided highly effective foam control, the foam being decreased to zero at 5 minutes and maintained at the zero to the end of the tests. (Tables 2-4 and FIGS. 1-3).

Examples 6 and 7

The weight percent of all components were modified in Compositions 6 and 7. They provided improved foam control capability compared to Compositions 1-4 (Tables 2-4 and FIGS. 1-3).

Example 8

Composition 8 removed polyalkylene glycol from Composition 5. The foam could not be well-controlled with this composition from the beginning of the test, and the foam height was doubled in the end of tests (Tables 2-4 and FIGS. 1-3).

In summary, the test data demonstrate that the antifoam of the present invention (Compositions 5-7) significantly improves foam control for a prolonged period of time compared to single components, polyalkylene glycol (Composition 1) or fatty alcohol alkoxylate (Composition 2), and other combinations (Compositions 3, 4 and 8). The major components for foam control are fatty alcohol polyalkoxylate, polyalkylene glycol and EO/PO copolymers. Two esters, polyethylene glycol ester and dialkyl phthalate, and polybutene aid in dispersion of the components including EO/PO block copolymer and fatty alcohol and help the make-down of the components in the system, while increasing the efficacy of the product.

TABLE 1

| Compositions of antifoamer/defoamer tested (by weight percent) | | | | | | |
|---|---|---|---|---|---|---|
| Material | Ester PEG 400 | Dialkyl phthalate | Fatty alcohol | Poly Glycol | EO-PO polymer | Poly-butene |
| Composition 1 | | | | 100 | | |
| Composition 2 | | | 100 | | | |
| Composition 3 | 0 | 0 | 72 | 10 | 5 | 13 |
| Composition 4 | 0 | 0 | 58 | 25 | 5 | 12 |
| Composition 5 | 8 | 8 | 50 | 20 | 4 | 10 |
| Composition 6 | 10 | 10 | 50 | 15 | 5 | 10 |
| Composition 7 | 10 | 10 | 50 | 20 | 5 | 5 |
| Composition 8 | 10 | 10 | 62 | 0 | 5 | 13 |

TABLE 2

| Foam height (mm) at 0 hours elapsed time Tested at concentration of 30 µl/L | | | |
|---|---|---|---|
| | Time from 0 hours | | |
| Material | 1 min. | 15 min. | 30 min. |
| Baseline* | >160 | >160 | >160 |
| Composition 1 | 10.8 | 10.8 | 10.8 |
| Composition 2 | 14.4 | 7.2 | 3.6 |
| Composition 3 | 18 | 0 | 0 |
| Composition 4 | 3.6 | 1.8 | 0 |
| Composition 5 | 10.8 | 0 | 0 |
| Composition 6 | 10.8 | 1.8 | 0 |
| Composition 7 | 10.8 | 1.8 | 1.8 |
| Composition 8 | 7.2 | 7.2 | 7.2 |

*Reached the maximum of the cylinder and overflowed

TABLE 3

Foam height (mm) at 3.5 hours elapsed time
Tested at concentration of 30 μl/L

| Material | Time from 3.5 hours | | |
|---|---|---|---|
| | 1 min. | 15 min. | 30 min. |
| Baseline | >160 | >160 | >160 |
| Composition 1 | 10.8 | 10.8 | 10.8 |
| Composition 2 | 3.6 | 3.6 | 3.6 |
| Composition 3 | 0 | 0 | 3.6 |
| Composition 4 | 0 | 0 | 0 |
| Composition 5 | 0 | 0 | 0 |
| Composition 6 | 0 | 0 | 0 |
| Composition 7 | 0 | 0 | 0 |
| Composition 8 | 7.2 | 7.2 | 7.2 |

TABLE 4

Foam height (mm) at 24 hours elapsed time
Tested at concentration of 30 μl/L

| Material | Time from 24 hours | | |
|---|---|---|---|
| | 1 min. | 15 min. | 30 min. |
| Baseline | >160 | >160 | >160 |
| Composition 1 | 10.8 | 14.4 | 18 |
| Composition 2 | 3.6 | 7.2 | 9 |
| Composition 3 | 1.8 | 9 | 14.4 |
| Composition 4 | 1.8 | 5.4 | 14.4 |
| Composition 5 | 0 | 0 | 0 |
| Composition 6 | 0 | 0 | 9 |
| Composition 7 | 0 | 0 | 1.8 |
| Composition 8 | 12.6 | 12.6 | 14.4 |

In a preferred embodiment, the present invention relates to a method of controlling foam of aqueous media comprising adding to said media a effective amount of composition including a) from about 5-40%, by weight, of a polyalkylene glycol, b) from about 20-90%, by weight, of a fatty alcohol alkoxylate, c) from about 1-20%, by weight, of an ethylene oxide-propylene oxide block copolymer, d) from about 3-25%, by weight, of polybutene, e) from about 3-25%, by weight, of a surfactant selected from the group consisting of a polyethylene glycol ester, sorbitan ester and polyoxyethylene/polyoxypropylene ester, and f) from about 3-25%, by weight, of a dialkyl phthalate, preferably a diisooctyl phthalate. The temperature range for treatment is preferably from about 50-90° C.

While the present invention has been described with respect to particular embodiments thereof, it is apparent that numerous other forms and modifications of the invention will be obvious to those skilled in the art. The appended claims and the present invention generally should be construed to cover all such obvious forms and modifications which are within the true spirit and scope of the present invention.

What is claimed is:

1. A method for defoaming Bayer process liquors, comprising adding to said liquors: a) from about 5-40% by weight of a polyalkylene glycol; b) about 20-90% by weight of a fatty alcohol ethoxylate/propoxylate; c) from about 1-20% by weight of an ethylene oxide-propylene oxide block copolymer, with an HLB of 1-5; d) from about 3-25% by weight of a polyethylene glycol ester surfactant; e) from about 3-25% by weight of a dialkyl phthalate; and f) from about 3-25% by weight of a polybutene.

2. The method as recited in claim 1, wherein the polyalkylene glycol is a linear or branched polymer of ethylene and propylene oxide.

3. The method as recited in claim 1, wherein the polyalkylene glycol has a molecular weight greater than 1000.

4. The method as recited in claim 1, wherein the polyalkylene glycol has a molecular weight of from 2500-5000.

5. The method as recited in claim 1, wherein the polyalkylene glycol has a cloud point less than 60° C.

6. The method as recited in claim 1, wherein the fatty alcohol ethoxylate/propoxylate has from 2-20 ethoxylate and 0-15 propoxylate units.

7. The method as recited in claim 1, wherein the ethylene oxide-propylene oxide block copolymer has a molecular weight of 1000-5000.

8. The method as recited in claim 1, wherein the polyethylene glycol ester surfactant is a PEG 400 dioleate or PEG 600 dioleate.

9. The method as recited in claim 1, wherein the polybutene has a number average molecular weight of about 300-3,000.

10. The method as recited in claim 1, wherein the dialkyl phthalate is diisooctyl phthalate or ditridecyl phthalate.

11. A method for defoaming Bayer process liquors, consisting essentially of adding to said liquors: a) from about 5-40% by weight of a polyalkylene glycol; b) about 20-90% by weight of a fatty alcohol ethoxylate/propoxylate; c) from about 1-20% by weight of an ethylene oxide-propylene oxide block copolymer, with an HLB of 1-5; d) from about 3-25% by weight of a polyethylene glycol ester surfactant; e) from about 3-25% by weight of a dialkyl phthalate; and f) from about 3-25% by weight of a polybutene.

12. The method as recited in claim 11, wherein the polyalkylene glycol is a linear or branched polymer of ethylene and propylene oxide.

13. The method as recited in claim 11, wherein the polyalkylene glycol has a molecular weight greater than 1000.

14. The method as recited in claim 11, wherein the polyalkylene glycol has a molecular weight of from 2500-5000.

15. The method as recited in claim 11, wherein the polyalkylene glycol has a cloud point less than 60° C.

16. The method as recited in claim 11, wherein the fatty alcohol ethoxylate/propoxylate has from 2-20 ethoxylate and 0-15 propoxylate units.

17. The method as recited in claim 11, wherein the ethylene oxide-propylene oxide block copolymer has a molecular weight of 1000-5000.

18. The method as recited in claim 11, wherein the polyethylene glycol ester surfactant is a PEG 400 dioleate or PEG 600 dioleate.

19. The method as recited in claim 11, wherein the polybutene has a number average molecular weight of about 300-3,000.

20. The method as recited in claim 11, wherein the dialkyl phthalate is diisooctyl phthalate or ditridecyl phthalate.

* * * * *